Figure 1:
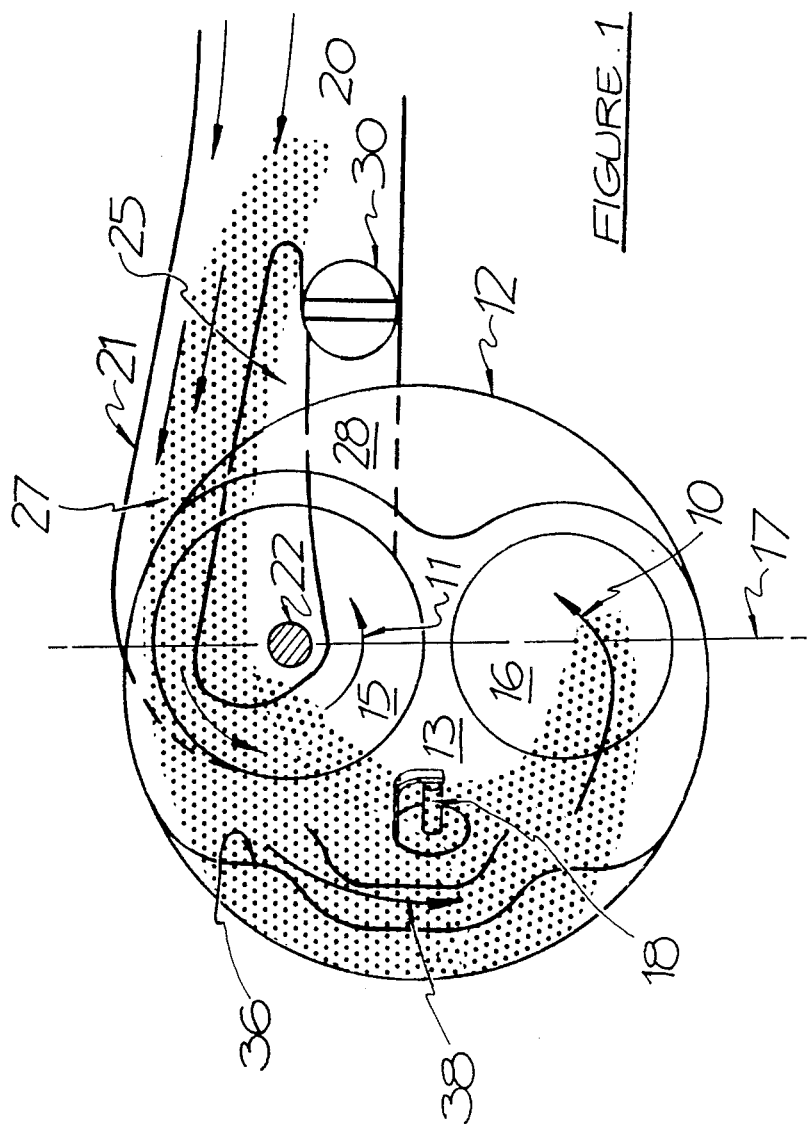

United States Patent [19]

Leighton et al.

[11] Patent Number: 4,844,040

[45] Date of Patent: Jul. 4, 1989

[54] ENGINES

[75] Inventors: Sam R. Leighton, Nedlands; Gregory B. Bell, Woodlands, both of Australia

[73] Assignee: Orbital Engine Company Proprietary Limited, Western Australia, Australia

[21] Appl. No.: 167,966

[22] Filed: Mar. 14, 1988

[30] Foreign Application Priority Data

Mar. 13, 1987 [AU] Australia ............... PI0840

[51] Int. Cl.⁴ ............................. F02B 31/00
[52] U.S. Cl. ................. 123/306; 123/188 M; 123/432
[58] Field of Search ............ 123/306, 308, 188 M, 123/432

[56] References Cited

U.S. PATENT DOCUMENTS

| | | | |
|---|---|---|---|
| 4,485,774 | 12/1984 | Kanda et al. | 123/188 M |
| 4,485,775 | 12/1984 | Kanda et al. | 123/188 M |
| 4,502,432 | 3/1985 | Okumura et al. | 123/188 M |
| 4,503,819 | 3/1985 | Okumura et al. | 123/188 M |
| 4,516,544 | 5/1985 | Okumura et al. | 123/188 M |
| 4,519,355 | 5/1985 | Fujimura | 123/308 |
| 4,586,469 | 5/1986 | Okumura et al. | 123/188 M |

Primary Examiner—E. Rollins Cross
Attorney, Agent, or Firm—Armstrong, Nikaido, Marmelstein, Kubovcik & Murray

[57] ABSTRACT

A spark ignited four stroke cycle internal combustion engine having variable volume combustion chamber, ignition means to provide an ignition point in said combustion chamber, a valve controlled inlet port communicating the combustion chamber with an air induction passage through which air flows to the engine. The induction passage including a wall shaped to direct at least part of the air flowing along said wall portion when the port is open in a generally helical path about the port axis and when the port is open, the air flowing is directed into the combustion chamber to establish therein a generally helical air flow. A fuel injector nozzle located to deliver fuel into the induction passage on the opposite side of the inlet port axis to said wall portion of the induction passage and on a trajectory through the port when open to form an ignitable fuel cloud at the ignition point.

17 Claims, 3 Drawing Sheets

ENGINES

This invention relates to internal combustion engines operating on the four stroke cycle and wherein fuel is injected into the air induction system at a location upstream of the point of entry of the air into the cylinder or cylinders of the engine.

In the control of the undesirable components of engine exhaust gas it is recognised that control of the location of the fuel within the combustion chamber is an important factor. In particular, when the engine is operating at low and medium loads within the overall load range of the engine, it is desirable to establish a relatively rich readily ignitable mixture of fuel and air in the engine combustion chamber in close proximity to the ignition point, even though the overall air/fuel ratio of the charge may be lean. In achieving this desirable condition in the vicinity of the ignition point, it is necessary to endeavour to limit the extent of penetration of the fuel into those areas of the combustion chamber more remote from the ignition point.

At high engine loads the total quantity of fuel delivered to the combustion chamber is sufficiently high that even a homogeneous mixture of the air and fuel will be readily ignitable. Accordingly at high loads it is unnecessary to exercise control of the fuel distribution in the combustion chamber so as to concentrate the fuel near the ignition point. It is in fact desirable not to do so, since at high loads it becomes necessary to fully utilise all of the oxygen in the combustion chamber in order to achieve combustion of all of the fuel and full engine output.

In order to achieve the required fuel distribution for low and medium engine loads, it has been proposed to create in the charge in the combustion chamber a stratified distribution of the fuel, with the majority of the fuel adjacent the cylinder head, where the ignition source is located. This stratified distribution of the fuel, commonly referred to as "axial stratification", is usually created by causing the incoming charge to move in a generally spiral path about the axis of the cylinder which inhibits axial mixing of the early introduced part of the charge with the later introduced part. Further it is usual to attempt to control the introduction of the fuel into the air so the major portion of the fuel enters the cylinder late in the induction cycle. In a fuel injected engine, it is desirable that the timing of injection is delayed to concentrate the fuel in the later induced part of the charge and to reduce the time available prior to ignition for mixing of the fuel with the charge in the cylinder.

The effect of controlling the fuel distribution during low and medium load operation is to decrease fuel consumption due to the higher ratio of specific heats of the working fluids, and to reduce pumping losses by allowing a large air charge to be drawn into the cylinder without an inherent leaning out of the air/fuel ratio at the ignition point. In addition the larger air charge reduces the peak temperature in the combustion chamber, with resultant NOx and general emissions reduction.

The problem of controlling the fuel distribution in the cylinder is more pronounced in a manifold injected engine compared with direct injected engines, partly because of the longer time interval between commencement of injection of the fuel and inlet port closure, which results in the fuel being carried deeper into the cylinder and therefore mixed with more air. Also with manifold injection the air charge may be subject to significant turbulence in the manifold which results in dispersion of the fuel in the air before entering the engine cylinder. These problems are increased by the physical size of commercial fuel injector units currently available which results in the injector being located a considerable distance from the actual entry of the mixture into the cylinder, and therefore the fuel having a longer distance to travel, hence earlier injection timing, and more time for mixing of the fuel and air in the manifold.

The desirability of establishing a stratification of the fuel charge in the cylinder of a manifold injected four stroke cycle engine, under low to medium load conditions, is well recognised and there has been a substantial effort expended in designing induction systems for four stroke engines that will achieve axial stratification and yet will also be capable of providing a substantially homogeneous air/fuel mixture under high load conditions. Varying degrees of success have been achieved with axial stratification of fuel to the extent that, in the more successful engines, overall air/fuel ratios of the order of 20–25:1 have been obtained at low to medium load operation. Nevertheless in the known engine constructions operating with axial stratification, it is still considered that the overall air/fuel ratios could be improved if better control of the fuel distribution in the cylinder could be achieved. However, further increases in the air/fuel ratio, without more effective fuel distribution control, lead to adverse effects on the mis-fire limit and stabililty of the engine operation, both factors influencing engine drivability, which are therefore potential problems.

The majority of current proposals involve the dividing of the induction passage so as to enable the effective cross section thereof to be reduced under low to medium load conditions and shaping that reduced cross-section portion of the induction passage in a generally helical form about the axis of the inlet port. This restricting of the area of the passage and the helical formation thereof promotes the establishment of a circular or swirling motion of the incoming air as it passes through the inlet port and that motion is maintained by the air after entry to the engine cylinder.

In some proposals, the dividing wall extends downwardly from the roof of the induction passage partway of the depth of the passage, whilst in other proposals the wall extends down the full depth of the induction passage to effectively divide it into two smaller sectioned passages only one of which is of helical shape. A rotary valve is usually provided to allow either the complete or partial separation of the induction passage so that the flow of air may be selectively diverted from one section of the induction passage so that substantially all of the incoming air travels through the helical shaped section of the induction passage. The rotary valve element is normally electronically controlled so that it will operate to restrict the flow under low to medium load conditions, thereby increasing the air flow through the helical section, and be opened under high load conditions to provide an unrestricted air flow. The unrestricted flow would reduce the intensity of the swirl, and the air flow into the cylinder through the non-helical section will disturb what swirl is initially established in the cylinder, the result being a near homogeneous air/fuel mixture.

Typical examples of the above discussed forms of induction passages for four stroke cycle engines are to be found in Toyota Jidosha Kabushiki Kaisha's Australian Patent Nos. 433872 and 452150.

In a further development there has been proposed to divide the induction passage for a substantial distance upstream from the inlet port so as to provide effectively two concentric ports, one communicating with a spiral outer passage, and the other with a central generally cylindrical passage. In these constructions the air flow enters the cylinder from the outer spiral passage under low load conditions and through both passages, or selectively through the central cylindrical passage only during high load conditions. Although this construction may tend to provide improved stratification under low load conditions, the construction of the induction system and the concentric inlet ports and valves is more complex. Typical examples of these foms of inlet port construction are to be found in the Nissan Motor Company Ltd.'s Australian Patent Nos. 12639 and 511290.

Yet a further proposed construction is to be found in U.S. Pat. No. 4669434, assigned to Toyota Jidosha Kabushiki Kaisha, wherein a "siamese" arrangement of inlet ports are provided, fed from a single induction passage. Each of the ports operates simultaneously under all loads, however, the passage leading to one of the ports is configured to provide a helical or swirl motion to the incoming charge, whilst the passage leading to the other port is of a generally straight configuration so as to not create swirl. Under light load conditions a rotary valve upstream from the inlet ports is operated to substantially close the straight passage, whereby substantially all of the incoming air will pass through the passage shaped to impart swirl motion to the air as it enters the engine cylinder. Apart from the high production cost of the "siamese" port configuration, it has the same general problem of the split passage arrangement previously discussed.

In all of the above discussed previously proposed constructions of inlet passages and port arrangements, the object has been to impart a helical motion to the air as it enters the cylinder so that this motion will continue in the air charge in the engine cylinder, and to introduce the fuel into the incoming air charge so that the fuel will be axially stratified within the engine cylinder. However, the resulting swirl motion of the fuel/air mixture in the cylinder introduces a disadvantage in achieving the required stratification of the fuel and the providing of a rich mixture in the vicinity of the engine ignition device. Although the swirl motion of the air within the engine cylinder assists in the promotion of axial stratification, it also results in the fuel being subject to centrifugal forces which will tend to throw the fuel outwardly within the cylinder towards the cylinder walls, thereby reducing the amount of fuel located generally in the centre of the swirl and hence centre of the engine cylinder. It will be appreciated that the effect of the centrifugal force will increase as the time period that the fuel is subject to the swirl motion increases. In a carburetted or throttle body injected engine, where the fuel is delivered into the induction system a substantial distance upstream from the inlet port, the fuel must be admitted to the induction system early in the induction stroke so that there is sufficient time for all the fuel to travel down the induction passage and into the engine cylinders before the inlet valve, or valves, close. It will thus be appreciated that the fuel would, under these circumstances, be in the cylinder for a considerable time and thus there would be a substantial migration of the fuel towards the wall of the cylinder due to the centrifugal effects. Also the length of the fuel path within the induction passage, and the time that it is within that passage, all contribute to a mixing and dispersing of the fuel within the incoming air charge, thus further adversely affecting the establishment of a high degree of axial stratification, that is the concentration of the fuel adjacent the head of the cylinder.

The above problems associated with carburetted and throttle body injected engines is somewhat reduced by individual injection into the respective induction passage of each cylinder. However, where the induction passage is divided by a full or partial wall, or in a Siamese port configuration, the fuel is normally injected into the induction manifold at a distance upstream from the commencement of the dividing of the air flow between the two passages. This limit on the location of the point of injection of the fuel into the induction passage arises both from performance considerations and also from the fact that the physical size of currently used fuel injectors is such that there is simply insufficient space in the immediate vicinity of the inlet ports and valves to fit the relatively bulky injector. Also, as the injector is required to deliver fuel under both high and low load conditions, the injector must be located sufficiently upstream from the dividing wall in the induction passage so that under high load conditions, the fuel will be supplied to the air passing through the two alternative paths to the cylnder so that substantially homogeneous distribution of the fuel in the air can be obtained for maximum power under high load. Typical locations of the fuel injector in the prior art stratified engines are to be found in FIG. 3 of the above referred to U.S. Pat. No. 4669434, FIG. 3 of Australian Pat. No. 513710, FIG. 9 of Australian Pat. No. 511290 and FIG. 1 of Australian Pat. No. 512639.

It is to be particularly noted that in FIG. 9 of Australian Pat. No. 511290, two fuel injector units are provided, one in each of the air induction passages in order to obtain the required distribution of the fuel during both high and low load engine operating conditions.

All of the above referred to prior art proposals for achieving axial stratification of the fuel in the cylinder under low to medium load conditions, exhibit characteristics which detract from obtaining a high degree of axial stratification and the providing of a sufficiently rich mixture in the vicinity of the ignition device for effective ignitability of the mixture and flame propagation. The detrimental characteistics are firstly that injection timing must be such that injection commences early in the induction cycle, thus resulting in the fuel being dispersed relatively widely within the incoming air charge and as a consequence some fuel is distributed more deeply into the combustion chamber than is desirable. Secondly, again due to early injection, the fuel is located within the engine cylinder for a greater length of time and thus a relatively high degree of migration of the fuel towards the wall of the cylinder results from the centrifugal forces encountered. In view of these factors, it is therefore necessary for the overall air/fuel ratio of the mixture in the combustion chamber to be selected to compensate for the deep penetration and outward migration of the fuel within the cylinder to thereby ensure that the air/fuel ratio of the proportion of the charge at the point of ignition is sufficiently rich to provide the required ignitability and flame propagation.

It is the object of the present invention to provide an improved induction and fuel injection configuration for a four stroke cycle internal combustion engine, which will result in a retention of a greater part of the fuel in the proximity of the ignition point by providing a higher degree of beneficial stratification of the charge in the cylinder both in the axial and radial directions.

It is a further object of the present invention to provide for a four stroke cycle internal combustion engine a construction whereby axial stratification of the fuel can be controlled more effectively than achieved in the past and hence more fuel efficient operation may be achieved under low and medium load operation.

With these objects in view there is provided a spark ignited four stroke cycle internal combustion engine having a cylinder closed at one end by a cylinder head, a piston supported to reciprocate in said cylinder and defining therewith a variable volume combustion chamber, ignition means mounted in said cylinder head to provide an ignition point in said combustion chamber, a valve controlled inlet port in said cylinder head communicating with the cylinder, an air induction passage communicating with the inlet port and through which air flows to enter the cylinder through the inlet port, said induction passage including a wall portion extending about at least part of the periphery of the inlet port and shaped to direct at least part of the air flowing along said wall portion when the port is open in a generally helical path about the port axis, said wall portion being located and shaped to direct, when the port is open, the air flowing along the wall portion into the cylinder to establish therein a generally helical air flow about the cylinder axis downwardly in the cylinder, a fuel injector nozzle located to deliver fuel into the induction passage on the opposite side of the inlet port axis to said wall portion of the induction passage and on a trajectory through the port when open and the helical air flow to form an ignitable fuel cloud at the ignition point.

Preferably the air flow in the induction passage is directed to establish a helical or swirl-like flow of air in the induction passage immediately upstream of the inlet port. Preferably the fuel is delivered from the nozzle into the air flow in the induction passage in a direction generally opposite to the helical flow of the air and may be inclined outwardly across the air flow. The direction of injecton of the fuel may be inclined to the plane of siwirl toward the inlet port.

Preferably the fuel injector nozzle is spaced upstream from the inlet port a distance not more than 35 mm and preferably between 15 to 30 mm, the distance being measured in a direction generally normal to the diametral plane of the inlet port at the face of the cylinder head.

The timing of the delivery of fuel relative to the closure of the inlet port is selected to contribute to the concentration of the fuel at the head end of the combustion chamber.

The helical air flow established at the inlet port is maintained in the air after entry to the combustion chamber through the inlet port, and reduces the extent of mixing of the fuel and air in the axial direction of the cylinder. Thus if the fuel is injected late in the open period of the inlet port, there is less time available for penetration of the fuel deeply into the combustion chamber. Also as the fuel is injected immediately upstream of the inlet port, only a short time is required for that fuel to enter the combustion chamber. Accordingly, injection of the fuel may be effected later than if the fuel were injected into the induction passage a more substantial distance upstream from the inlet port. Further the location of the injector nozzle, and the ability to time the injection late in the inlet port open period, both independently and collectively reduce the effects of centrifugal force on the fuel which would normally move the fuel outwardly towards the cylinder wall and so lean down the air/fuel mixture at the ignition point.

In a preferred embodiment the induction passage has a longitudinal extending partition extending a distance upstream from the immediate vicinity of the inlet port, thereby forming two air flow paths within the induction passage. Under low to medium load range operation, one of these paths is closed to thereby reduce the air flow path by approximately 50%. This results in the speed of the air flow increasing and the air being directed towards one side of the induction passage, thus promoting the establishment of the spiral flow as the air enters the combustion chamber through the inlet port.

In the following description of one practical arrangement of the present invention, as illustrated in the accompanying drawings, directions shall be identified on the basis that the engine is positioned with the axis of the cylinder vertical with the cylinder head uppermost. However, it will be appreciated that this identification is only for convenience and the engine may operate with the axis of the cylinder disposed in any direction.

Figure 2:
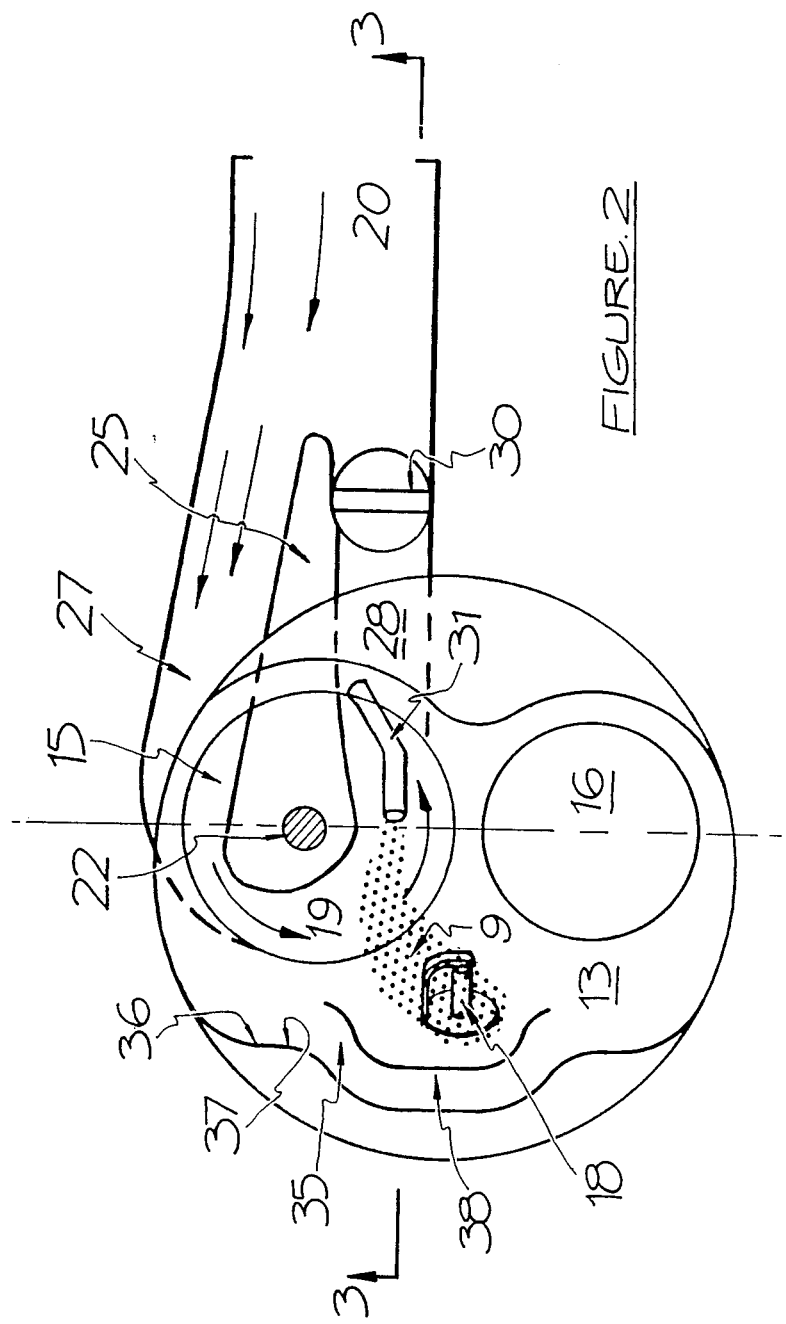
Figure 3:
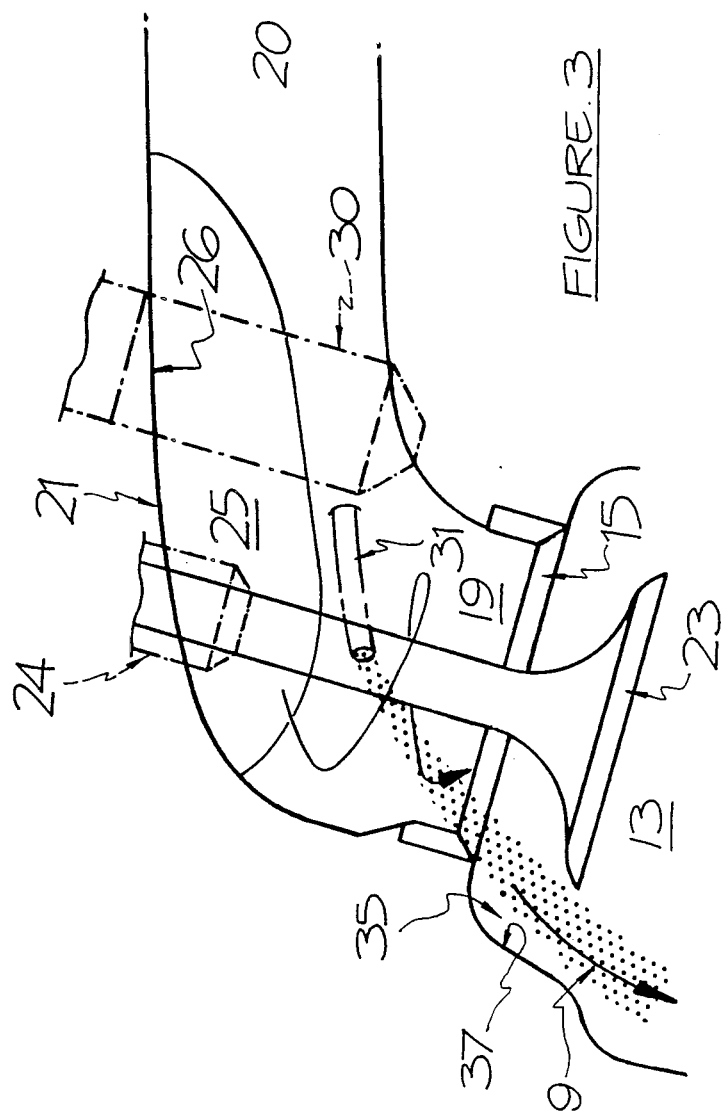

In the drawings,

FIG. 1 is a diagramatic view of a four stroke cycle engine cylinder head and inductionpassage, and the air flow therein, FIG. 2 is a view similar to FIG. 1, and showing the fuel flow therein, FIG. 3 is a sectional view along line 3—3 in FIG. 2.

FIG. 1 represents diagramatically part of a single cylinder four stroke cycle engine having a cylinder head 12 forming the top of the engine combustion chamber 13. Respective inlet and exhaust ports 15 and 16 are provided in the cylinder head, having conventional co-operating poppet valves (not shown in FIGS. 1 and 2) for selective opening and closing of the inlet and exhaust ports in the conventional manner. The inlet and exhaust ports have a common centre line 17, the spark plug 18 being displaced from that centre line 17, as seen in FIGS. 1 and 2. The spark plug 18 is located approximately equidistant from the centre of the respective inlet and exhaust ports and on the opposite side of the cylinder axis to the ports.

The inlet port 15 communicates with an air induction passage 20. The air induction passage has a portion 19 extending generally axially upwardly from the inlet port 15 for a short distance and a portion 21 that sweeps to the right hand side of the head (as seen in FIG. 3) in a generally smooth curve. As seen in FIG. 3, the stem 22 of the inlet port valve 23 extends co-axially through the portion 19 of the induction passage, and is slidably supported in a bush 24 provided in the cylinder head. A dividing wall 25 projects downwardly from the upper internal surface 26 of the induction passage 20 into the portion 19 of the induction passage and along the portion 21 of the induction passage extending towards the open end of that passage. As can be seen in FIG. 3, the wall 25 extends downwardly from the upper internal surface 26 about half the height of the passage portion 21 to generally divide the induction passage portion 21 into two smaller passages 27 and 28 which generally pass to either side of the valve stem 22.

Projecting downwardly through the cylinder head and through the passage portion 28 is a control valve 30 which may be rotated through half a revolution between a first position that provides a minimum obstruction to the passage of air along the passage portion 28 and a second position effectively closes that passage. The passage 27 blends into a generally arcuate form about the valve stem 22 so that the air flowing down the passage 27, when the inlet port is open, has imparted to it a rotary motion about the valve stem 22 as it enters the co-axial portion 19 of the induction passage, to cause a swirl or helical movement of the air in that portion of the induction passage.

It will be understood that air flow only exists in the induction passage 20 whilst the inlet valve 23 is in the open position, and thus the air flowing through the inlet port 15 into the combustion chamber 13 will have a swirling or helical motion. Further it will be appreciated that when the control valve 30 is in the second position preventing the passage of air along the passage portion 28, as shown in FIGS. 1 and 2, the majority of the air passing into the combustion chamber will flow along passage 27 and accordingly the velocity of that air will be increased from that which would be encountered in the same induction passage without the provision of the wall 25 and control valve 30. This increase in velocity of the air will increase the intensity of the swirling motion of the air in the area immediately upstream of the inlet port 15. The swirling motion of the air in that area, as indicated by the arrows 11 in FIG. 1, is substantially maintained in the air upon the air entering the combustion chamber 13, as indicated at 10 in FIG. 1.

The nozzle 31 is provided for the delivery of a metered quantity of fuel into the induction passage and is located so that the fuel enters the induction passage downstream of the position where the control valve 30 passes through the induction passage. Further the nozzle is located to deliver the fuel into the portion 19 of the induction passage where the air is moving in the spiral or swirling motion. The nozzle 31 is further located so that the fuel issuing therefrom is directed to pass through the opening provided between the external perimeter of the inlet valve 23 and the internal perimeter of the inlet port 15, when the inlet valve 23 is in the open position, with no substantial interference with the valve and port. There is therefore no substantial wetting of the inlet valve and port with fuel. Wetting of such components will reduce the degree of atomisation of the fuel and consequently reduce the ignitability and the overall combustibility of the fuel/air mixture in the combustion chamber.

The nozzle 31 is also located so that it is directed across the direction of swirl of the air in the portion 19 of the induction passage, and preferably is inclined rearwardly against the direction of swirl of the air. This results in the fuel generally travelling in a curved or arcuate path through the port and across the combustion chamber towards the spark plug 18, as represented at 9 in FIG. 2.

The inlet and exhaust ports 15 and 16 open into a cavity 35 in the cylinder head and the spark plug 18 is also located within the cavity 35. As can be seen in FIGS. 2 and 3, the peripheral wall 36 of the cavity forms a shroud around part of the inlet valve when the valve is open. The shroud has a generally arcuate portion 37 that assists in promoting the continuance of the swirling or helical motion of the air charge upon entry to the cylinder. The shape of the shroud at 38 about the spark plug 18 also assists in retaining the fuel cloud, formed from the fuel delivered into the air charge from the nozzle 31 when issued into the cylinder, in a pocket about the spark plug.

As is known, and as previously referred to, the control of the location and distribution of the fuel in the air charge is particularly necessary at low engine loads when the quantity of fuel injected is relatively small. Accordingly, in the embodiment above described the control valve 30 is located to effectively close the passage 28 when the engine is operating at low and possibly also medium loads, and passage 28 is open at all other times. The control valve 30 may be axially moved between its respective positions to open and close the passage 28 or as shown is of a suitable cross-section to move between open and closed positions by rotation on its longitudinal axis.

In the construction as above described the fuel is delivered into the induction passage at a location extremely close to the inlet port 15 so as to minimise mixing of the fuel with the air within the induction passage. Further, the fuel is directed by the nozzle 31 through the gap between the edge of the inlet port 15 and the inlet valve 23 into the combustion chamber and at the spark plug. These aspects of the construction reduce the time interval available for dispersing of the fuel in the air charge before ignition, and the existence of physical elements in the fuel port to promote fuel dispersion. In particular the construction above described reduces the centrifugal separation of the fuel in the combustion chamber as is experienced in other engines that create a swirling motion of the fuel/air charge in the engine combustion chamber.

The metering of the fuel may be effected by any suitably known equipment, and is preferably of the type wherein the metered quantity of fuel is entrained in a gas such as air which transports the fuel to and through the nozzle 31. Typical metering apparatus is disclosed in commonly assigned U.S. Pat. Nos. 4462760 and 4554945, and U.S. Pat. Application No. 866425, the disclosure of each being incorporated herein by reference.

The claims defining the invention are as follows.

We claim:

1. A spark ignited four stroke cycle internal combustion engine having a cylinder closed at one end by a cylinder head, a piston supported to reciprocate in said cylinder and defining therewith a variable volume combustion chamber, ignition means mounted in said cylinder head to provide an ignition point in said combustion chamber, a valve controlled inlet port in said cylinder head communicating with the cylinder, an air induction passage communicating with the inlet port and through which air flows to enter the cylinder through the inlet port, said induction passage including a wall portion extending about at least part of the periphery of the inlet port and shaped to direct at least part of the air flowing along said wall portion when the port is open in a generally helical path about the port axis, said wall portion being located and shaped to direct, when the port is open, the air flowing along the wall portion into the cylinder to establish therein a generally helical air flow about the cylinder axis downwardly in the cylinder, a fuel injector nozzle located to deliver fuel into the induction passage on the opposite side of the inlet port axis to said wall portion of the induction passage and on a trajectory through the port when open and the helical air flow to form an ignitable fuel cloud at the ignition point.

2. An engine as claimed in claim 1, wherein the nozzle is located to deliver the fuel into the induction passage at a location spaced upstream from the plane of the port a distance not more than 35 mm measured in a direction at right angles to said plane of the port.

3. An engine as claimed in claim 1 or 2, wherein the induction passage includes a separator wall extending upstream from adjacent the port and passing between the said wall portion and the fuel injector nozzle, said separator wall generally dividing the induction passage into two sections, one of said sections defined on opposite sides by said wall portion and separator wall being of a generally helical contour, and said fuel injector nozzle being located in the other of said sections.

4. An engine as claimed in claim 3 wherein the separator wall extends the complete height of the induction passage.

5. An engine as claimed in claim 3, wherein a valve means is provided in the induction passage upstream of the fuel injector nozzle, said valve means being selectively operable to limit the flow of air through said other section when the port is open.

6. An engine as claimed in claim 4, wherein valve means is provided in the induction passage upstream of the fuel injection nozzle, said valve means being selectively operable to substantially close said other section to the flow of air therethrough when the port is open.

7. An engine as claimed in claim 3, including means responsive to the engine load to actuate said valve means to permit a flow of air through said second section when the engine load is above a predetermined level.

8. An engine as claimed in claim 1 or 2, including means to control the timing of injection in relation to the engine cycle, said control means being responsive to engine load to effect injection during the latter half of the opened period of the inlet port.

9. An engine as claimed in claim 1 or 2, including a valve controlled exhaust port in the cylinder head, said inlet and exhaust ports being both spaced with respect to the cylinder axis toward one side of the cylinder, and the fuel injection nozzle is spaced with respect to the inlet port axis in the direction toward the exhaust port.

10. An engine as claimed in claim 9, wherein the ignition point is spaced from the cylinder axis in the direction opposite from the inlet and exhaust ports.

11. An engine as claimed in claim 1 or 2, wherein the induction passage immediately upstream of the inlet port is shaped so the air flow from said wall portion establishes therein an initial helical air flow that passes through the inlet port when open into the cylinder to establish the helical air flow in the cylinder.

12. An engine as claimed in claim 11, wherein the fuel injection nozzle is located so said trajectory of the fuel delivered from the nozzle is outwardly towards the periphery of the inlet port and rearward with respect to the initial helical air flow in the inlet passage.

13. An engine as claimed in claim 3, including means to control the timing of injection in relation to the engine cycle, said control means being responsive to engine load to effect injection during the latter half of the opened period of the inlet port.

14. An engine as claimed in claim 3, including a valve controlled exhaust port in the cylinder head, said inlet and exhaust ports being both spaced with respect to the cylinder axis toward one side of the cylinder, and the fuel injection nozzle is spaced with respect to the inlet port axis in the direction toward the exhaust port.

15. An engine as claimed in claim 3, wherein the induction passage immediately upstream of the inlet port is shaped so the air flow from said wall portion establishes therein an initial helical air flow that passes through the inlet port when open into the cylinder to establish the helical air flow in the cylinder.

16. A spark ignited four stroke cycle internal combustion engine having a cylinder closed at one end by a cylinder head, piston means reciprocating in said cylinder for defining therewith a variable volume combustion chamber, a spark plug mounted in the cylinder head, air induction passage means for supplying combustion air to the cylinder, a valve controlled inlet port in the cylinder head selectively communicating the air induction passage means with the cylinder, the air induction passage means including a wall portion means for directing air least part of the air flowing through said passage means when the inlet port is open in a generally helical path about the port axis into the cylinder to establish a generally helical air flow about the cylinder axis and downwardly in the cylinder, said wall portion means having a front part at the upstream portion thereof, and fuel injector nozzle means located in the passage means downstream of the front part of the wall portion means for delivering fuel into the passage means on a side of the inlet port axis opposite to the wall portion means and on a trajectory through the helical air flow and the inlet port when open to form an ignitable fuel cloud proximate the spark plug.

17. A spark ignited four stroke cycle internal combustion engine having a cylinder closed one end by a cylinder head, piston means reciprocating in said cylinder for defining therewith a variable volume combustion chamber, a spark plug mounted in the cylinder head, an air induction passage means for supplying combustion air to the cylinder, a valve controlled inlet port in the cylinder head selectively communicating the air induction passage means with the cylinder, the air induction passage means including separator wall means extending upstream from adjacent the inlet port and generally dividing the passage means into two sections, a first section on one side of the separator wall being of generally helical contour for directing at least part of the air flowing through said passage means when the inlet port is open in a generally helical path about the port axia and into the cylinder to establish a generally helical airflow about the cylinder axis and downwardly in the cylinder, a second section on the opposite side of the seperator wall having a selectively openable valve located therein, and fuel injector nozzle means located in the second section for delivering fuel into the passage means on a trajectory through the helical airflow and the inlet port when open to form an ignitable fuel cloud proximate the spark plug.

* * * * *